United States Patent Office 3,435,623
Patented Apr. 1, 1969

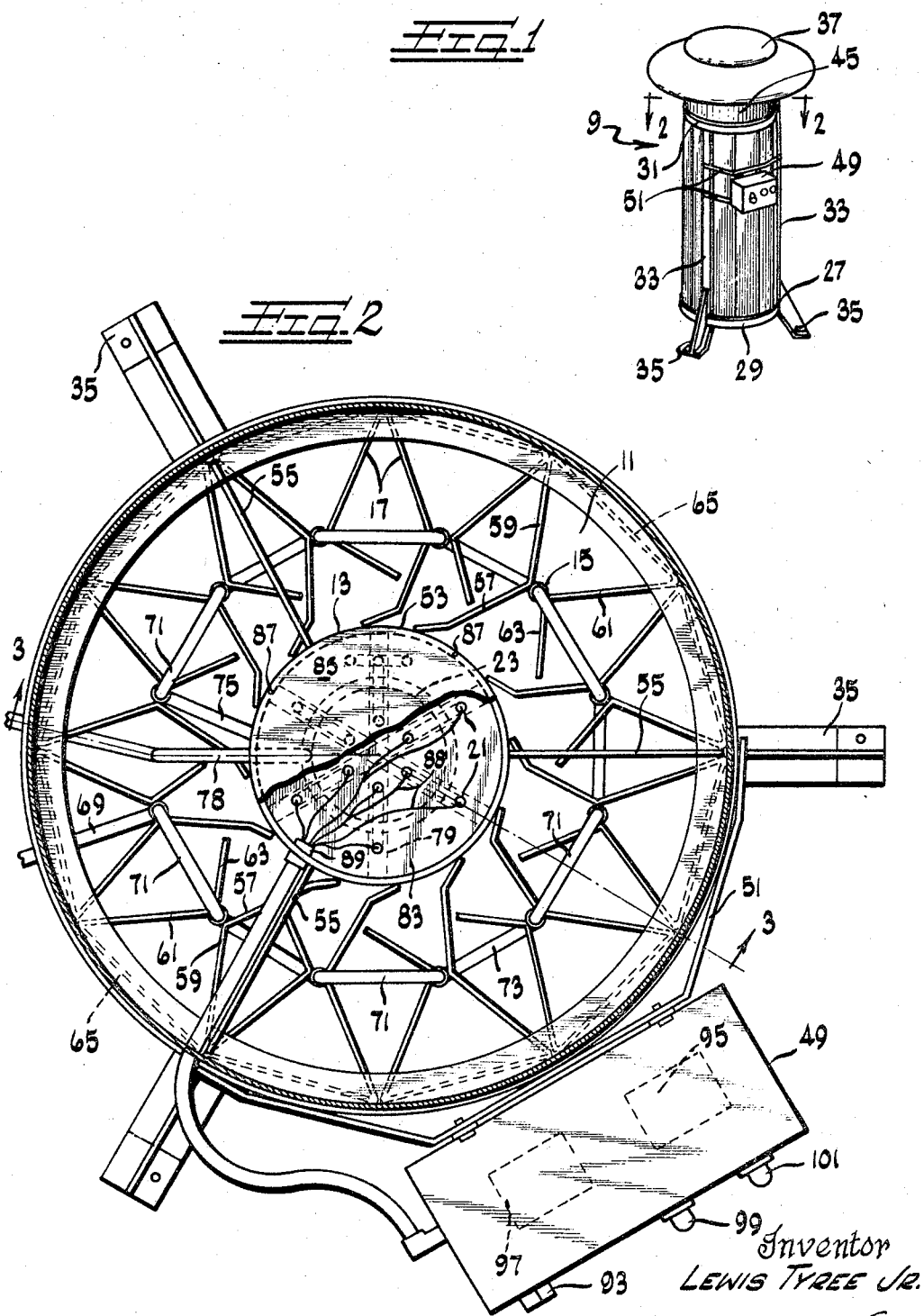

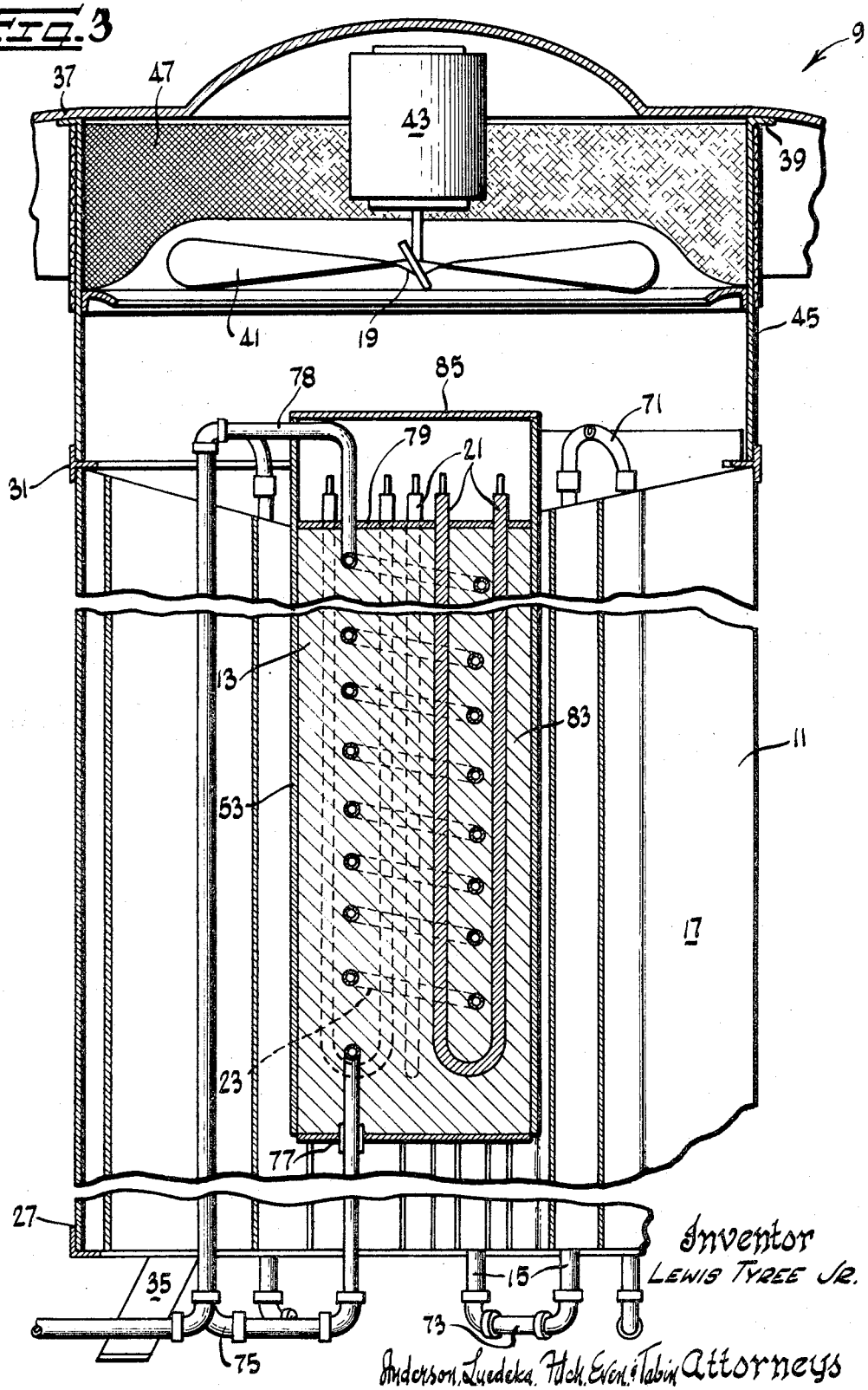

3,435,623
CRYOGENIC VAPORIZER
Lewis Tyree, Jr., Chicago, Ill., assignor to Liquid Carbonic Corporation, Chicago, Ill., a corporation of Delaware
Filed Aug. 22, 1967, Ser. No. 662,428
Int. Cl. F17c 7/02
U.S. Cl. 62—52
7 Claims

ABSTRACT OF THE DISCLOSURE

A cryogenic vaporizer having an ambient section which occupies an annular region within which a central electrical section is located. During operation the liquid is vaporized in the ambient section via passage through a plurality of elongated heat exchange elements and the vapor is passed through the central electrical section which is thermostatically controlled to raise the vapor temperature to that desired. Each heat exchange element is in physical contact with the central electrical section, and defrosting is carried out during off hours by thermal conduction of heat to the elements.

---

The present invention relates generally to devices for vaporizing cryogenic liquids, and more particularly to devices which employ the heat from the atmosphere in the vaporization of volatile liquids, such as oxygen and nitrogen, which have boiling points below −40° C. at atmospheric pressure.

Because it is advantageous to transport and store gases, such as oxygen, nitrogen and argon, in the liquid form and to then vaporize them when needed for use in the gaseous state, various types of vaporizers for carrying out the desired transformation from liquid to gas have been constructed. One general type of vaporizer for cryogenic liquids which utilizes the heat from the atmosphere to provide the necessary heat of vaporization for transformation to the gaseous state is called an ambient vaporizer. Ambient vaporizers have the particular economic advantage of obtaining the necessary heat of vaporization free of cost from the atmosphere. One particularly advantageous type of ambient vaporizer is described in U.S. Patent 3,293,871.

Because of the inherent conditions of operations of ambient vaporizers, they are often located outside the particular building wherein the gas being generated is used. Although ambient vaporizers, such as that described in the above-identified U.S. patent, may be operated outdoors very efficiently throughout most months of the year even in the northern regions of the United States, certain atmospheric conditions, i.e., high relative humidity and temperatures near the freezing point of water, may create icing problems with ambient vaporizers because of the condensation and freezing of water vapor from the air. Although ambient vaporizer designs, in particular the design of the vaporizer described in the above-identified U.S. patent, may combat icing and reduce the adverse effect of icing, the operational disadvantages caused by icing have not been totally eliminated. Vaporizers of this type which are still less affected by adverse atmospheric conditions are desired.

It is an object of the present invention to provide a vaporizer for cryogenic liquids having improved operating characteristics. Another object is to provide a vaporizer of the above-identified type which can be successfully operated outdoors during periods of prolonged adverse atmospheric conditions. It is a further object to provide a cryogenic vaporizer of the ambient type which is designed to facilitate the removal of ice from heat transfer surfaces.

Still another object of the present invention is to provide a cryogenic vaporizer of the ambient type having excellent capacity relative to its unit volume for the supply of cryogenic vapor at a desired temperature above the liquid boiling point.

Other objects and advantages of the invention will become readily apparent from the following detailed description when read in conjunction with the accompanying drawings wherein:

FIGURE 1 is a perspective view of a device embodying various features of the invention;
FIGURE 2 is an enlarged horizontal sectional view taken generally along the line 2—2 of FIGURE 1; and
FIGURE 3 is an enlarged vertical sectional view of the device shown in FIGURE 1 taken generally along the line 3—3 of FIGURE 2.

Very generally, a device 9 for vaporizing cryogenic liquids is provided having a generally annularly arranged ambient heat transfer section 11 which surrounds and is in contact with a central electrically heated heat transfer section 13. The piping arrangements of the device 9 is such that the two sections are in series connection with the outlet from the ambient section 11 being in direct fluid connection with the inlet to the central electrical section 13. The ambient section of the vaporizer 9 is generally similar to that disclosed and described in U.S. Paten 3,293,871, the disclosure of which is incorporated herein by reference.

In the illustrated vaporizer 9, the ambient section 11 includes a plurality of vertically aligned tube sections 15, twelve in number. Attached to each of the vertical tubes 15 is an extended surface fin element 17 which primarily provides a large radiation heat transfer surface. Each of the fins 17 is made of a material having a relatively high thermal conductivity, such as copper. A fan 19 located vertically above the ambient section 11 assures maintenance of the desired circulation of air downwardly therethrough whenever vaporization is being carried out. Each of the fins 17 is in physical contact with the central electrical section 13, thereby facilitating the transfer of heat by conduction from the central electrical section to the fins 17 of the ambient section 11.

The illustrated central electrical section 13 includes a plurality of electrical heating elements 21 disposed generally about a coil 23 through which the fluid exiting from the piping system of the ambient section 11 is passed. In its normal use the demand upon the vaporizer 9, in terms of rate of fluid flow and desired amount of temperature rise, will usually be such that both the ambient and the electrical sections are required to produce the desired outlet temperature. Under usual operation conditions the vaporization is completed in the ambient section 11; however, at a very high flow rate, vaporization might be completed in the electrical section. On the other hand, if the temperature of the atmosphere were sufficiently high and the desired rate of fluid flow and the desired temperature of the gaseous product sufficiently low, the ambient section 11 alone might be sufficient to complete the vaporization of all the liquid and raise the temperature of the gas exiting from the ambient section 11 the desired increment above the boiling point. Normally, however, the vaporization is completed in the ambient section 11, and the central electrical section 13 is used to increase the temperature of the gas vaporized to a desired increment above the boiling point of the cryogenic liquid and it is operated in this manner which makes the vaporized particularly efficient. Such operation utilizes the large available $\Delta t$ between the ambient temperature and the temperature of the fluid when it is at its coldest and utilizes the higher than ambient temperature available from the central heater section 13 to provide a sufficiently large $\Delta t$ to efficiently heat the warmer vaporized gas. Moreover, when icing occurs as a result of adverse atmospheric conditions, the electrical central section 13 is employed to defrost the ambient section 11 during a period of non-use, for example, overnight, thus readying the vaporizer 9 for operation when next needed.

Generally, the vaporizer 9 includes a supporting frame 27 which is made of a lower ring 29, an upper ring 31, and three uprights 33 which extend therebetween and interconnect the two rings. The lower ring 29 is of generally L-shaped cross section and may be rolled from a suitable mild steel angle iron. The lower ring 29 has three supporting legs 35 suitably connected thereto, each leg being located adjacent one of the uprights 33 and suitably joined thereto. The upper ring 31 is generally T-shaped in cross section and may be made by rolling a mild steel T member. An umbrella-like hood 37 is supported vertically above the upper rim by suitable brackets 39. The fan 19 is made up of a blade 41 and a drive motor 43 which is mounted immediately below the central portion of the hood 37. A tubular sleeve 45 is disposed in surrounding relation to the fan 19 between the hood 37 and the upper ring 29. The tubular sleeve 45 has an upper section made of screening material 47 to allow for the easy entry of air into the central region below the hood 37 wherefrom it is blown downward by the fan 19 past the fin elements 17 of the ambient section 11 which it heats.

An electrical control box 49 is mounted by a suitable mounting bracket 51 at a location adjacent the upper part of the vaporizer 9. The mounting bracket spans the distance between two of the uprights 33 and is suitably attached thereto. All of the necessary electrical controls for the vaporizer 9 are included in the electrical control box 49 and electrical leads extend therefrom to the individual functional components of the vaporizer.

The central electrical section 13 includes a generally cylindrical outer container 53 of circular cross section which is supported in the central position within the vaporizer by three radially extending support brackets 55 which are suitably connected, as by welding, to the exterior surface of the container and to the upper surface of the T-shaped upper ring 31 upon which they rest. The twelve heat exchange fin elements 17 are arranged in the annular region surrounding the central electrical section container 53, and they individually extend between the upper ring 31 and the lower ring 29.

As best seen in FIGURE 2, each of the heat exchange fin elements 17 is formed from a single metal sheet bent to provide five separate sections, 57, 59, 61, 63 and 65. When viewed endwise as in FIGURE 2, sections 57, 59, 61 and 63 are arranged generally in the shape of an X with the vertical tube section 15 being disposed at the center of the X. Moreover, the sections 59 and 61 are of substantially the same size, and they form, when viewed endwise, an isosceles triangle with the section 65 as the base. Furthermore, the section 57 is bent near its extremity so as to bear in good physical contact against the exterior surface of the container 53 of the electrical section.

The vertical tubes 15 are securely joined to the fin sections along the entire length of the heat exchange fin element 17, as by soldering, so as to provide a good path for thermal flow between the vertical tubes and the heat exchange elements. The overall arrangement of the twelve tubes 15 and twelve heat exchange elements 17, as shown in the illustrated vaporizer, is such that the twelve fin sections 65, which individually serve as defroster panels, when viewed endwise form the sides of a regular polygon of twelve sides. Each of the defroster panels 65 is connected by a suitable screw (not shown) at its top to the upper ring 31 and at its bottom to the lower ring 29 so as to provide stability in the overall structure.

The liquid to be vaporized enters the vaporizer 9 through an inlet 69 at the bottom through which it is directed to the bottom of one of the vertical tubes 15 in the ambient section 11. The tubes 15 are alternately connected, in a counterclockwise direction as viewed in FIG. 2, by generally U-shaped connecters 71 at the tops and U-shaped connecters 73 at their bottoms to place all twelve of the pipes in series fluid connection. Accordingly, the fluid exits from the last pipe 15 in series at the bottom thereof through an outlet pipe 75.

As previously indicated, the path for the fluid through the central electrical section 13 is provided by a conduit formed in the shape of a coil 23. The outlet 75 from the ambient section is connected to the lower end of the coil 23. The central electrical section container 53 is generally in the shape of a cylinder of circular cross section having an integral bottom and may be formed by welding a suitable disc to the bottom of a metal tube of the desired diameter. The coil inlet enters through the bottom of the container 53 through a suitable hole that is closed as by threaded bushing 77. The main body of the coil 23 is a conduit in the form of a helix which is disposed coaxially within the cylindrical container 53. The coil 23 has an outlet 78 which exits horizontally from the container 53 through a notch cut in the upper edge thereof.

Six U-shaped heating elements 21 are disposed radially within the container 53, being located with one leg interior of the helix and the other leg radially exterior of the helix. The seventh heating element is a spare and is mounted near the periphery of the container 53. In forming the central electrical section 13, the helical coil 23 and the seven heating elements 21 are first positioned within the container 53 in the desired locations. The six radially extending heating elements 21 are supported by three tie straps 79 which extend diametrically across the container 53 at a location near the upper end thereof. The tie straps 79 are arranged at 60° angular increments to one another and are suitably attached, as by welding, to the internal wall surface of the container 53. Each of the tie straps 79 contains four holes through which pass the upper ends of two of the U-shaped heating elements 21 supported thereby. When the seven heating elements 21 and the coiled conduit 23 are positioned as desired, the entire remaining space within the lower part of the container 53 is filled with molten aluminum 83 to provide a solid core. The aluminum core 83 provides excellent heat conduction between the six heating elements 21, the coil 23 and the outer container 53 with which each of the fin heat exchange elements 17 is in physical contact. A cover plate 85 is attached, as by suitable screws 87 to the top of the container 53 to cover the electrical connections which are made to the upper ends of the heating elements 21 by means of lead wires 88 which pass through an electrical connecter 89 in the sidewall of the container 53. The aluminum core 83 fills the container 53 up to about the level of the tie straps 79. Because the central electrical section 13 is provided with a potted aluminum core, it would of course be fairly difficult to replace a heating element 21 should one of the electrical resistance heating elements burn out. Accordingly, the seventh heating element 21 is provided as a spare, already in position to operate, and an eighth element may also be provided as a second spare if desired. The six radially disposed heating elements 21 may be wired for either 220 volt or 440 volt operation, as desired.

The control box 49 contains a three-position switch 93 which is marked for "off," "operate" and "defrost." The control box also contains thermostatic controls 95 and 97. Thermostat 95 is designed to read the exit temperature of the fluid leaving the outlet 78 from the coil 23 via a suitable thermocouple (not shown) associated with the outlet pipe. Thermostat 97 is adapted to read the temperature of the aluminum core 83 of the central electrical section 13 and is accordingly connected to a thermocouple (not shown) located within the aluminum in the container 53.

When the inlet pipe 69 to the ambient section 11 is connected to a suitable cryogenic pump for supplying the liquid to be vaporized, and the control box 49 is connected to a suitable source of electrical power, the vaporizer 9 is ready to operate. The thermostat 95 is set to the desired outlet gas temperature, and the switch 93 is turned to the "operate" position. Turning the switch to the "operate" position starts the fan motor 43, turns on a green light 99 on the control box cabinet 49 and connects the electrical section to electrical power through the thermostats 95 and 97 allowing the six resistive heating elements 21 to automatically cycle "on" and "off" in response to the setting of the thermostat 95. The thermostat 97 is preset at the desired maximum position and is used to prevent excessive core temperatures in the event the thermostat 95 should fail for any reason to disconnect power from the heating elements 21 when the desired fluid temperature is achieved in the outlet pipe 79.

Depending upon the temperature of the atmosphere and upon the particular outlet gas temperature selected via the thermostat 95, the ambient section 11 will usually not be sufficient to itself supply all the necessary latent heat of vaporization to vaporize the cryogenic liquid at the flow rate at which it is being pumped therethrough and also the necessary sensible heat to raise the temperature of the gas generated to the desired level. The outlet gas temperature is sensed by the thermocouple, and to maintain it at that set on the thermostat 95, the heating elements 21 are cycled on and off sufficiently frequently to supply the necessary heat to the aluminum core 83 in order to transfer enough heat to the fluid in the coil 23 to raise its temperature from that at which it exits from the ambient section 11.

One example of a vaporizer 9 made generally as illustrated utilizes twelve vertical tubes 15, each about four feet long and each attached to a fin 17 bent from a copper sheet about 22 x 48 inches, a fan blade 41 driven by a one-half horsepower motor, and six resistive heaters 21 each rated at 3500 watts at 240 volts which are disposed about a helical coil 23 made out of stainless steel tubing one-half inch in diameter and formed with seventeen turns on a one and one-half inch pitch. Under average ambient conditions, the vaporizer 9 having the above design parameters, effectively vaporizes nitrogen and provides nitrogen gas at temperatures within the range of between about −20° F. and about 100° F. at flow rates up to about 15,000 standard cubic feet of gas per hour. Moreover, the vaporizer effectively controls the outlet gas temperature to within about plus or minus 5° F.

The switch 93 is normally left in the "operate" position even during periods when there may be a lull in pumping. This allows defrosting to occur (should any ice have formed on the fins 17) during such periods of no flow because the fan continues to operate, circulating ambient temperature air through the ambient section 11 of the vaporizer. When pumping of cryogenic liquid is resumed, the outlet gas temperature may momentarily rise but will quickly return to the point set by the thermostat 95, and the piping system between the vaporizer outlet 78 and the use point of the gas will normally dissipate any momentary rise in temperature.

Defrosting of the vaporizer, as indicated above, automatically occurs during periods of no flow when the ambient air temperature is above 32° F. so long as the switch 93 is left in the "operate" position. When the ambient temperature drops below 32° F. and the fin elements 17 collect ice, defrosting is usually carried out either overnight or over a weekend period when no gas flow is required and the cryogenic pump is accordingly not run. When such extended defrosting is desired, the selector switch 93 is turned to the "defrost" position, lighting an amber light 101 on the control box cabinet 49 to give a visual indication that the vaporizer 9 is on the "defrost" cycle. With the switch 93 turned to "defrost," the six heating elements 21 are cycled "on" and "off" to maintain the core 83 of the central electrical section at the temperature set by the thermostat 97, usually about 150° F. The heat from the electrical section container 53 is transferred by radiation and conduction to the fins 17 of the ambient section 11 causing them to reach a temperature sufficient to melt the ice which has formed thereupon. The vaporizer 9 should of course be located where the runoff of water during defrosting can be accommodated. Operation in this manner is found to effectively carry out defrosting of the vaporizer 9 in the instances wherein an amount of ice forms that would not be removed during the automatic defrosting periods of no fluid flow through the vaporizer.

The invention provides an extremely versatile vaporizer which primarily utilizes the ambient temperature of the atmosphere to transform a cryogenic liquid into a gas taking advantage of the large available $\Delta t$. The central electrical section 13 is connected as a second-stage heater for the fluid exiting from the ambient section and allows closely controlled outlet gas temperatures significantly above the boiling point to be achieved with only minimal inputs of electrical power even during periods of adverse atmospheric conditions. Furthermore, the design of the vaporizer is such that a continuous supply of cryogenic gas can be maintained throughout the normal working day even during winter months when atmospheric conditions are such that icing would severely detract from the performance of conventional ambient vaporizers.

It should be understood that various modifications and changes such as would be apparent to those skilled in the art may be made to the device described and illustrated herein without deviating from the scope of the invention which is defined in the appended claims. For example, the heat exchange elements 17 may be connected in parallel fluid flow arrangement, rather than in series. Alternatively, extruded heat exchange elements may be used which include a number of fins radiating from an integrally formed central tube. Various of the features of the invention are set forth in the claims which follow.

What is claimed is:

1. A device for vaporizing cryogenic liquid that utilizes heat from the atmosphere, which device comprises a plurality of spaced heat exchange elements made of material having good thermal conductivity, said plurality of heat exchange elements being arranged in an annular region and in a location to afford ready contact with air from the atmosphere, a means for flowing a fluid in heat exchange relationship with each of said heat exchange elements, a central heater disposed in a location in the center of said annular region which central heater contains electrical heating means, and conduit means connected to said fluid flow means which directs the fluid exiting from said fluid flow means along a path in heat transfer relationship with said central heater, said central heater being in heat conduction physical contact with each of said plurality of spaced heat exchange elements.

2. A device in accordance with claim 1 wherein said conduit means connected to said fluid flow means includes a helical portion which extends through said central heater along an axis parallel to said plurality of heat exchange elements which extend parallel to one another.

3. A device in accordance with claim 2 wherein said electrical heating means contains a plurality of resistive electrical heating elements disposed in locations intermediate said helical portion and said spaced heat exchange elements.

4. A device in accordance with claim 3 wherein said central heater includes a cylindrical container coaxial with and surrounding said helical portion and containing said electrical heating elements and wherein a material having good thermal conductivity fills the remaining portion of said container to provide a good heat flow path between said heating elements, said helical portion and the outer surface of said container which is in physical contact with said heat exchange elements.

5. A device in accordance with claim 4 wherein said plurality of electrical heating elements are each generally U-shaped and are disposed with the legs of the U flanking said helical portion and oriented radially with respect to said cylindrical chamber.

6. A device in accordance with claim 1 wherein thermostat means is provided in combination with said electrical heating means for monitoring the temperature of the fluid completing travel along said path in association with said central heater, which thermostat means controls the supply of electrical power to said electrical heating means, providing for the supply of power thereto whenever the temperature of the fluid drops below the temperature at which said thermostat means is set.

7. A device in accordance with claim 1 wherein means is provided for maintaining said central heater at a predetermined temperature to cause defrosting of said heat exchange elements should they become iced from water vapor in the atmosphere.

References Cited

UNITED STATES PATENTS

| | | | |
|---|---|---|---|
| 2,516,218 | 7/1950 | Kerr | 62—52 |
| 3,153,439 | 10/1964 | Golden | 62—52 |
| 3,293,871 | 12/1966 | Tyree | 62—52 |

LLOYD L. KING, *Primary Examiner.*